(12) United States Patent
Mikawa (10) Patent No.: US 10,549,225 B2
(45) Date of Patent: Feb. 4, 2020

(54) CERAMIC FILTER FOR BEVERAGE AND MANUFACTURING METHOD OF THE SAME

(71) Applicant: Takashi Mikawa, Saga (JP)

(72) Inventor: Takashi Mikawa, Saga (JP)

( * ) Notice: Subject to any disclaimer, the term of this patent is extended or adjusted under 35 U.S.C. 154(b) by 0 days.

(21) Appl. No.: 16/232,680

(22) Filed: Dec. 26, 2018

(65) Prior Publication Data

US 2019/0201824 A1 Jul. 4, 2019

(30) Foreign Application Priority Data

Dec. 28, 2017 (JP) .................................. 2017-254969

(51) Int. Cl.
| | |
|---|---|
| *B01D 39/20* | (2006.01) |
| *C04B 35/636* | (2006.01) |
| *A47J 31/06* | (2006.01) |
| *C04B 35/111* | (2006.01) |
| *B28B 7/34* | (2006.01) |
| *B28B 3/02* | (2006.01) |
| *C04B 38/06* | (2006.01) |
| *C04B 35/117* | (2006.01) |
| *C04B 38/00* | (2006.01) |
| *B28B 11/24* | (2006.01) |
| *B28B 1/04* | (2006.01) |

(52) U.S. Cl.
CPC .......... *B01D 39/2072* (2013.01); *A47J 31/06* (2013.01); *A47J 31/0605* (2013.01); *B28B 1/04* (2013.01); *B28B 3/02* (2013.01); *B28B 7/344* (2013.01); *B28B 11/24* (2013.01); *C04B 35/111* (2013.01); *C04B 35/117* (2013.01); *C04B 35/6365* (2013.01); *C04B 38/0054* (2013.01); *C04B 38/0675* (2013.01); *B01D 2239/1216* (2013.01); *B01D 2239/1258* (2013.01); *C04B 2235/3217* (2013.01); *C04B 2235/349* (2013.01)

(58) Field of Classification Search
None
See application file for complete search history.

(56) References Cited

U.S. PATENT DOCUMENTS

| | | | |
|---|---|---|---|
| 4,560,336 A | 12/1985 | Bühler et al. | |
| 5,773,103 A | * 6/1998 | Ciora, Jr. | ........... B01D 39/2093 210/500.21 |

FOREIGN PATENT DOCUMENTS

| | | |
|---|---|---|
| JP | S60-132703 | 7/1985 |
| JP | S60-161932 U | 10/1985 |
| JP | S63-175526 U | 11/1988 |
| JP | H06-054760 | 3/1994 |

(Continued)

OTHER PUBLICATIONS

Henry et al. (International Journal for Service Learning in Engineering, 2013, 1, 62-77). (Year: 2013).*

(Continued)

*Primary Examiner* — Clare M Perrin
(74) *Attorney, Agent, or Firm* — HoustonHogle LLP (57) ABSTRACT

Provided is a ceramic filter for a beverage, the ceramic filter requiring a permeation time ranging from 3 seconds to 15 seconds in a case where 150 ml of hot water having a temperature of 90° C. is introduced, having a total pore volume of 0.230 to 0.270 cm³/g, and having a median pore diameter of 100 to 160 μm. Also provided is a method for manufacturing the ceramic filter.

5 Claims, 5 Drawing Sheets

(56) References Cited

FOREIGN PATENT DOCUMENTS

JP         H07-053279         2/1995

OTHER PUBLICATIONS https://www.youtube.com/watch?v=eoN08DECY1Y dated Aug. 31, 2017.
www.youtube.com/watch?v=1dLD1cV0kUg dated Aug. 7, 2017.
https://www.youtube.com/watch?v=wk5ffNrwoMY dated Aug. 31, 2017.
http://www.39arita.jp/ dated Sep. 1, 2017.
https://cafend.net/coffee-cerafilter/ dated Oct. 4, 2017.
http://tabi-labo.com/284294/39-arita dated Oct. 17, 2017.
https://www.rakuten.co.jp/bluegiraffe/ dated Oct. 17, 2017.
Notification of Reasons for Refusal dated Jun. 1, 2018 for Japanese Patent Application No. 2017-254969. 7 pages.
Written Amendment dated Aug. 6, 2018 for Japanese Patent Application No. 2017-254969. 11 pages.
Decision to Grant a Patent dated Oct. 15, 2018 for Japanese Patent Application No. 2017-254969. 7 pages.

\* cited by examiner

CERAMIC FILTER FOR BEVERAGE AND MANUFACTURING METHOD OF THE SAME

RELATED APPLICATIONS

This application claims priority to Japanese Patent Application No. 2017-254969, filed on Dec. 28, 2017, which is incorporated herein by reference in its entirety.

BACKGROUND OF THE INVENTION

Field of the Invention

The present invention relates to a ceramic filter for a beverage and a method for manufacturing the ceramic filter for a beverage.

Related Art

In the related art, a filter is used in a case where a beverage such as coffee and black tea is brewed. The filter is used for the purpose of extracting the beverage from ground and powdered coffee beans or tea leaves and filtering the beverage. Paper filters are frequently used as such beverage filters. In addition, porous ceramic filters in which multiple micropores are formed have been proposed as substitutes for paper filters (see, for example, Patent Document 1).

Patent Document 1: Japanese Unexamined Patent Application, Publication No. H06-54760

SUMMARY OF THE INVENTION

In a case where the ceramic filters are used, beverage extraction and filtration can be performed without elution of components contained in paper unlike in the case of paper filters. In addition, the ceramic filters can be used repeatedly. Further, in the case of ceramic filter-based beverage extraction and filtration, the oil content and unpleasant taste components contained in a beverage are adsorbed by ceramic micropores, and thus the beverage can be excellent in flavor.

However, when it comes to the ceramic filters, the oil content and unpleasant taste components are excessively adsorbed when the size of the micropores is too small. Then, the flavor of the beverage deteriorates and filter clogging becomes more likely. On the other hand, when the size of the micropores is too large, the oil content and unpleasant taste components remain in quantity in the beverage. The flavor deteriorates as a result, too.

Accordingly, an object of the present invention is to provide a ceramic filter for a beverage with which clogging hardly occurs and a beverage with an excellent flavor can be obtained and a method for manufacturing the ceramic filter for a beverage.

Regarding a ceramic filter, the inventors of the present invention have found that filtration for an excellent flavor can be performed and clogging can be hindered by micropores being formed such that beverage filtration is performed at a specific rate. The inventors have arrived at the present invention based on the findings.

The present invention relates to a ceramic filter for a beverage. The ceramic filter requires a permeation time ranging from 3 seconds to 15 seconds in a case where 150 ml of hot water having a temperature of 90° C. is introduced, has a total pore volume of 0.230 to 0.270 $cm^3/g$, and has a median pore diameter of 100 to 160 μm.

In addition, preferably, the ceramic filter for a beverage is formed in a bowl shape.

The present invention also relates to a method for manufacturing the ceramic filter for a beverage requiring a permeation time ranging from 3 seconds to 15 seconds in a case where 150 ml of hot water having a temperature of 90° C. is introduced, having a total pore volume of 0.230 to 0.270 $cm^3/g$, and having a median pore diameter of 100 to 160 μm. The method for manufacturing the ceramic filter for a beverage includes a kneading process of obtaining a kneaded material in which 55 to 65 mass % of alumina, 6 to 12 mass % of bentonite, 6 to 10 mass % of water-insoluble organic fine particles, and 15 to 30 mass % of water are mixed, a primary molding process of molding a primary molded article by manually pressing the kneaded material against a filter mold, a secondary molding process of molding a secondary molded article by performing press working on the primarily molded primary molded article, and a firing process of firing the secondary molded article molded in the secondary molding process.

According to the present invention, it is possible to provide a ceramic filter with which clogging hardly occurs and a beverage with an excellent flavor can be obtained and a method for manufacturing the ceramic filter.

DETAILED DESCRIPTION OF THE INVENTION

Figure 1:
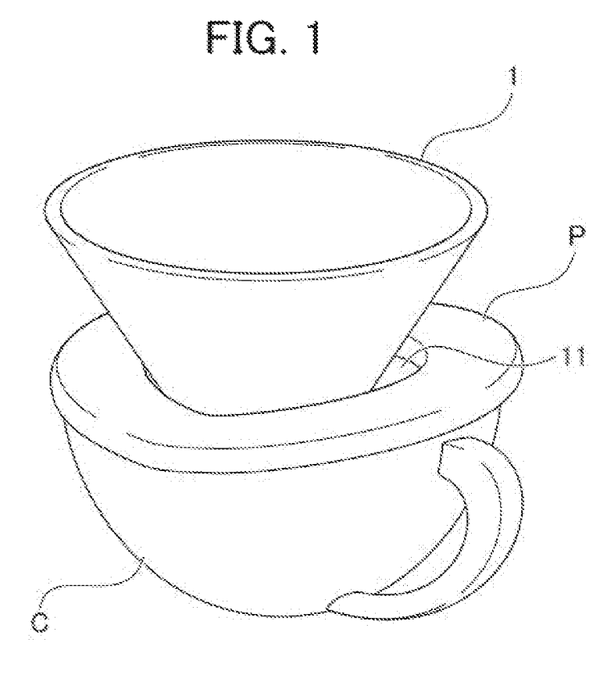
FIG. 1 is a perspective view illustrating a ceramic filter, a filter receiver, and a cup according to an embodiment of the present invention.
Figure 2:
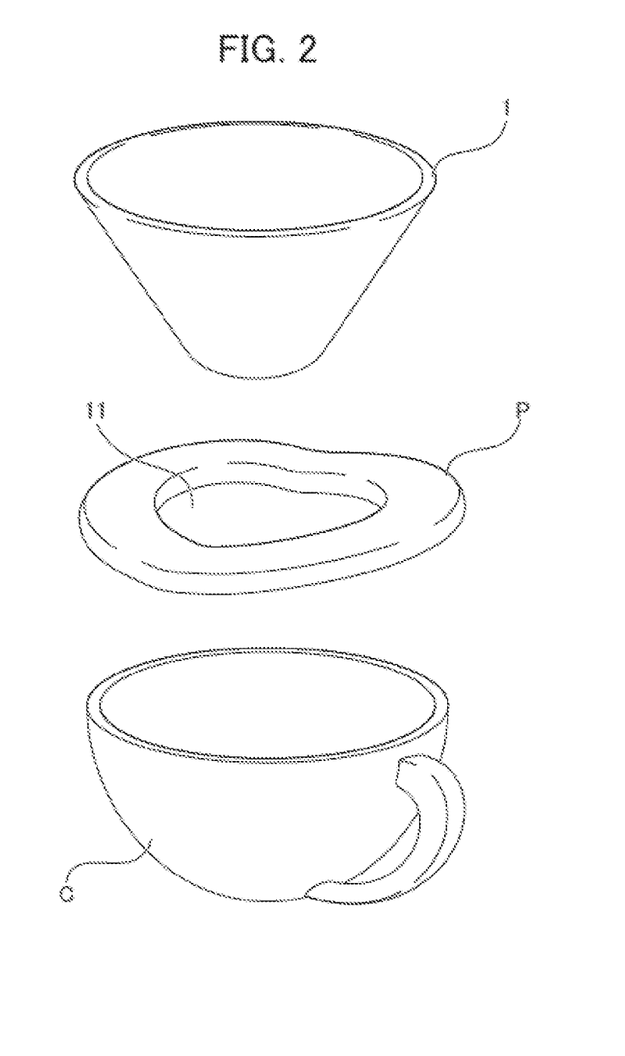
FIG. 2 is a perspective view illustrating the ceramic filter, the filter receiver, and the cup illustrated in FIG. 1 in a separated state.

Hereinafter, an embodiment of the present invention will be described. However, the present invention is not limited to the following embodiment. A ceramic filter 1 of the present embodiment is used in, for example, a case where filtration is performed after a beverage is extracted from ground and powdered coffee beans or tea leaves and a case where water for a beverage, an alcoholic beverage, or the like is filtered. As illustrated in FIGS. 1 and 2, the ceramic filter 1 is molded into a bowl shape from a porous ceramic in which multiple micropores are formed. In other words, the ceramic filter 1 is configured by the whole of a bowl-shaped filter being integrally molded with a porous ceramic having a filtration function. More specifically, in the present embodiment, the ceramic filter 1 has an arc shape with a downwardly bulging bottom surface and has a curved (almost linear) inner surface with side surfaces slightly curved inwards in a longitudinal section (see FIG. 4C). In addition, in the longitudinal section of the ceramic filter 1, an angle θ formed by the side surfaces is approximately 60 degrees.

In addition, the thickness of the ceramic filter 1 is preferably 2 mm to 5 mm from the viewpoint of maintaining the strength of the ceramic filter 1 and ensuring a suitable filtration performance. In the present embodiment, the ceramic filter 1 has a thickness of 2.5 mm.

As for the ceramic filter 1, a permeation time ranging from 3 seconds to 15 seconds is required in a case where 150 ml of hot water having a temperature of 90° C. is introduced. By the permeation time required in a case where 150 ml of hot water having a temperature of 90° C. is introduced ranging from 3 seconds to 15 seconds, a beverage extracted and filtered by means of the ceramic filter 1 can be excellent in flavor. In addition, it is possible to suppress clogging of the ceramic filter 1 attributable to a filtered material such as coffee beans and tea leaves resulting from the filtration. In addition, the permeation time required in a case where 150 ml of hot water having a temperature of 90° C. is introduced preferably ranges from 3 seconds to 10 seconds and more preferably ranges from 4 seconds to 8 seconds.

In addition, as for the ceramic filter 1, it is preferable that a permeation time ranging from 5 seconds to 40 seconds is required in a case where 150 ml of water having a temperature of 20° C. is introduced. By the permeation time required in a case where 150 ml of water having a temperature of 20° C. is introduced ranging from 5 seconds to 40 seconds, a mild-taste beverage can be obtained in a case where a cold beverage (such as sake and water) is filtered with the ceramic filter 1. In addition, the permeation time required in a case where 150 ml of water having a temperature of 20° C. is introduced preferably ranges from 5 seconds to 20 seconds and more preferably ranges from 7 seconds to 15 seconds.

Further, the ceramic filter 1 has a total pore volume ranging from 0.230 to 0.270 $cm^3/g$ and a median pore diameter ranging from 100 to 160 μm in terms of pore distribution measured by a mercury press-in method. By the micropores of the ceramic filter 1 being formed so as to fall within the above ranges, the ceramic filter 1 becomes less prone to clogging and a beverage with an excellent flavor can be obtained.

The ceramic filter 1 of the present embodiment can be manufactured by material blending and a manufacturing method being carried out as follows. In other words, by the material blending and the manufacturing method being carried out as follows, the size and the porosity of the multiple micropores formed in the ceramic filter 1 are appropriately set. The above filtration rate is realized as a result.

[Method for Manufacturing Ceramic Filter]

Next, the method for manufacturing the ceramic filter 1 of the present embodiment will be described with reference to FIGS. 3A to 3C and FIGS. 4A to 4C. The method for manufacturing the ceramic filter 1 of the present embodiment includes (1) a kneading process, (2) a primary molding process, (3) a secondary molding process, (4) a drying process, and (5) a firing process.

(1) Kneading Process

In the kneading process, the materials of the ceramic filter 1 are kneaded into a clay form. In the kneading process, a kneaded material is obtained as a result of mixing of 55 to 65 mass % of alumina, 6 to 12 mass % of bentonite, 6 to 10 mass % of water-insoluble organic fine particles, and 15 to 30 mass % of water (see FIG. 3A).

Powder is used as each of the alumina, the bentonite, and the water-insoluble organic fine particles. More specifically, the particle size (center particle size) of the alumina is preferably 100 μm to 500 μm, more preferably 150 μm to 400 μm, and even more preferably 200 μm to 300 μm. In addition, powdered crystalline cellulose can be used as an example of the water-insoluble organic fine particles.

In the present embodiment, the kneaded material is obtained by 55 to 65 mass % of alumina, 6 to 12 mass % of bentonite, 6 to 10 mass % of water-insoluble organic fine particles, and 15 to 30 mass % of water being mixed as a result of blending within this range. As a result, it is possible to form suitable micropores and set an appropriate porosity for the ceramic filter 1 manufactured by means of the obtained kneaded material. Especially, by the content of the water-insoluble organic fine particles in the kneading process ranging from 6 to 10 mass %, micropores suitable for the manufactured ceramic filter 1 can be formed at an appropriate ratio. In addition, by the moisture content ranging from 15 to 30 mass %, the kneaded material can be formed so as to be hard enough to facilitate primary molding in the primary molding process (described later). Incidentally, the alumina content is preferably 58 to 63 mass %, and the bentonite content is preferably 8 to 10 mass %. In addition, the content of the water-insoluble organic fine particles is preferably 7 to 9%, and the moisture content is preferably 17 to 23 mass %.

(2) Primary Molding Process

Figure 3A:
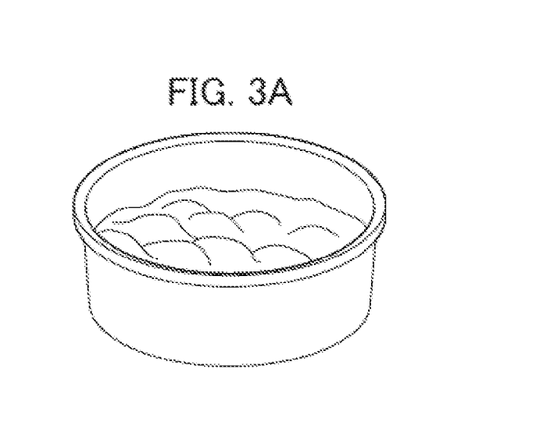
FIG. 3A is a diagram illustrating a process for manufacturing the ceramic filter of the present invention.
Figure 3B:
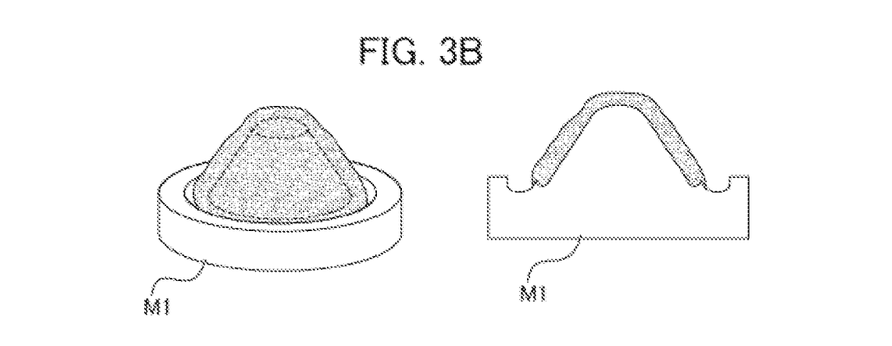
FIG. 3B is a diagram illustrating a process for manufacturing the ceramic filter of the present invention.

In the primary molding process, the kneaded material obtained in the kneading process is pressed against a filter mold and a primary molded article is molded as a result. A plaster mold is used as the filter mold for the ceramic filter 1. Specifically, in the primary molding process, the clay-like solid kneaded material is pressed against the surface of a convex inner mold M1 forming the inner side of the ceramic filter 1 as illustrated in FIG. 3B and such that a predetermined thickness (3.0 to 3.5 mm) is reached. The primary molded article is molded as a result. In the primary molding process, the solid kneaded material is pressed so as to have a predetermined thickness and primarily molded in this manner. As a result, it is possible to mold a secondary molded article without an excessive increase in press pressure in the following secondary molding process. As a result, the water permeability of the ceramic filter 1 to be manufactured can be enhanced. In the primary molding process, the kneaded material is pressed by hand against the filter mold.

(3) Secondary Molding Process

Figure 3C:
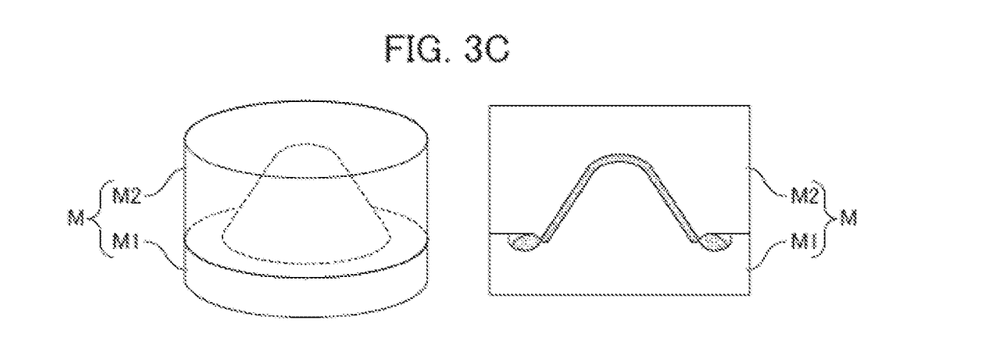
FIG. 3C is a diagram illustrating a process for manufacturing the ceramic filter of the present invention.

In the secondary molding process, the secondary molded article is molded by press working being performed on the primary molded article molded in the primary molding process. As illustrated in FIG. 3C, in the secondary molding process, the primary molded article molded in the primary molding process is covered with an outer plaster mold M2, which has a concave surface and forms the outer side of the ceramic filter 1. Then, the outer mold M2 is pressed with a predetermined force and the press working is performed on the primary molded article. The secondary molding process can be carried out by, for example, pressure being applied with a vise or the like in a state where a plurality of sets (for example, five sets) of the inner mold M1 and the outer mold M2 sandwiching the primary molded article are stacked. The press working is performed for approximately an hour in the secondary molding process. As a result, the secondary molded article is molded. Here, in the present embodiment, the secondary molding (press working) is performed after the primary molded article is molded in the primary molding process. As a result, the pressure applied by the press working can be set low. As a result, moisture can be uniformly present in the molded secondary molded article, and thus the distribution of the micropores formed in the ceramic filter 1 to be manufactured can be homogenized. In other words, it is necessary to further increase the applied pressure in a case where a ceramic filter is molded simply by press molding without the primary molding process. When molding is performed at a high pressure, the moisture contained in the kneaded material exudes during press working, and then separation is likely to occur in the moisture contained in the molded article. As a result, it is difficult to homogenize the micropores formed in the ceramic filter to be manufactured.

(4) Drying Process

Figure 4A:
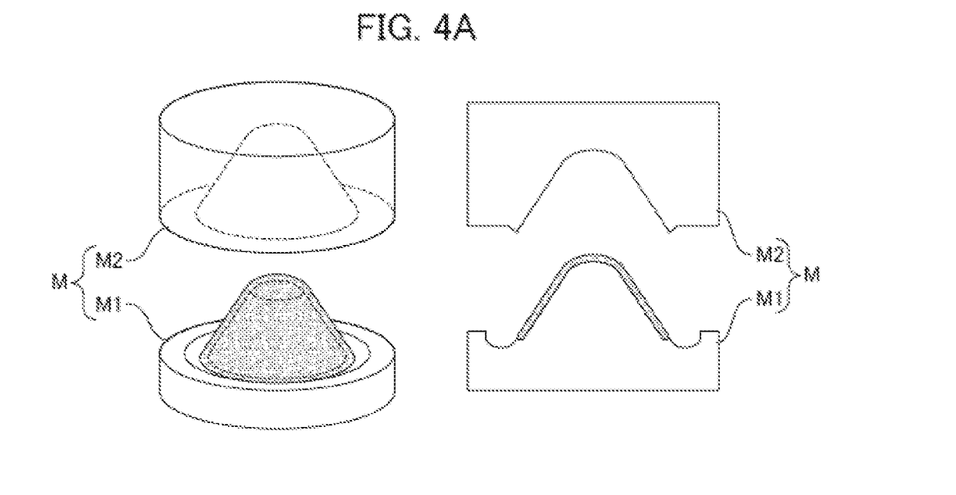
FIG. 4A is a diagram illustrating a process for manufacturing the ceramic filter of the present invention.
Figure 4B:
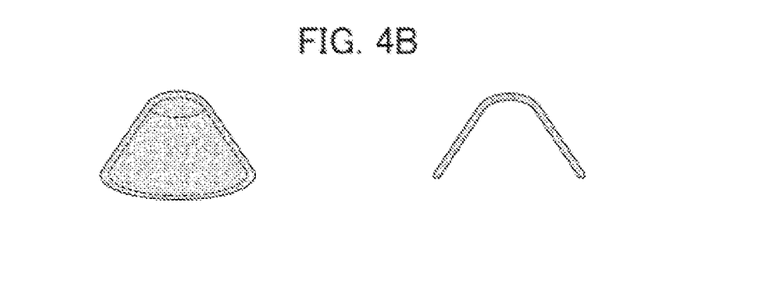
FIG. 4B is a diagram illustrating a process for manufacturing the ceramic filter of the present invention.
Figure 4C:
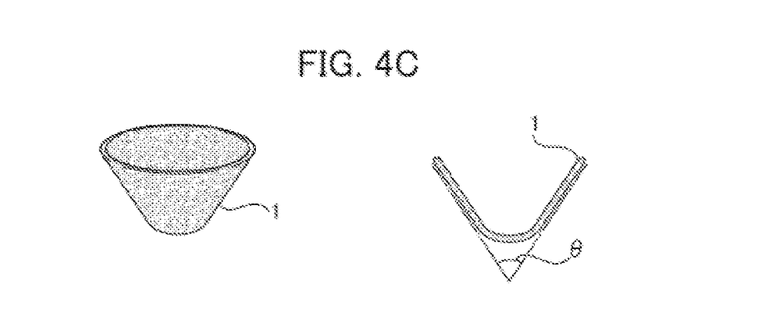
FIG. 4C is a diagram illustrating a process for manufacturing the ceramic filter of the present invention.

As illustrated in FIGS. 4A and 4B, in the drying process, the secondary molded article molded in the secondary molding process is taken out from a filter mold M and dried. The drying time in the drying process can be appropriately set depending on air temperature, humidity, and the like. The drying in the drying process is performed for approximately 3 days in, for example, a 25° C. and 60% humidity environment.

(5) Firing Process

In the firing process, the secondary molded article molded in the secondary molding process and dried in the drying process is fired. More specifically, burr finishing is performed first on the secondary molded article dried in the drying process. Burrs, which are parts unnecessary for a product, are scraped off from the secondary molded article during the burr finishing. Subsequently, the burr-finished secondary molded article is fired for 10 hours to 15 hours at 1,200° C. to 1,300° C. The water-insoluble organic fine particles contained in the secondary molded article are decomposed and the multiple micropores are formed in the firing process. Also, the micropores are formed as a result of evaporation of the moisture remaining in the secondary molded article. The ceramic filter 1 is manufactured through the above processes (see FIG. 4C).

The ceramic filter 1 of the present embodiment is used with a filter receiver P as illustrated in FIG. 1. A plate-shaped member constitutes the filter receiver P of the present embodiment. A hole portion 11 is formed in the middle portion of the plate-shaped member. The ceramic filter 1 is disposed in the hole portion 11. The hole portion 11 is shaped so as to support the ceramic filter 1 at three or more points. The hole portion 11 is shaped such that a predetermined clearance is formed between the hole portion 11 and the outer surface of the ceramic filter 1. By shaping the hole portion 11 so as to support the ceramic filter 1 at three or more points and such that the predetermined clearance is formed as described above, it is possible to suitably filter a beverage even with the ceramic filter 1 that is capable of performing filtration throughout the filter. In addition, it is possible to easily see a filtered beverage from the clearance. In the present embodiment, both the outer shape and the hole portion 11 of the filter receiver P are formed in a heart shape.

In a case where coffee is brewed with the ceramic filter 1, ground coffee beans are placed in the ceramic filter 1 first. Preferably, the coffee beans are ground by coarse grinding or medium grinding. Next, the filter receiver P is disposed on a coffee cup C, and the ceramic filter 1 in which the ground coffee beans are placed is disposed in the hole portion 11 of the filter receiver P. In this state, hot water is poured once to the extent that the hot water reaches the whole beans and the beans are left for a while (for approximately 20 seconds or so). Then, approximately 150 ml of hot water is slowly poured additionally. As a result, coffee with an excellent flavor can be obtained.

Although each preferred embodiment and example of the ceramic filter of the present invention have been described above, the present invention is not limited to each embodiment and example described above and can be appropriately modified.

EXAMPLES

Hereinafter, the present invention will be more specifically described with reference to examples. The present invention is not limited by the examples.

Example 1

The ceramic filter of Example 1 (capacity: 200 ml) was manufactured by the manufacturing method described above. In the kneading process, 3,065 g of alumina (manufactured by Fuji Manufacturing Co., Ltd., product name Fuji Random A60), 465 g of bentonite (manufactured by HOJUN Co., Ltd., product name HOTAKA), 400 g of cellulose fine particles (manufactured by Asahi Kasei Corp., product name CEOLUS TGF-20), and 1,070 g of water were mixed with a mixer and kneaded by hand kneading. In the primary molding process, the kneaded material was pressed by hand against the surface of an inner plaster mold and the primary molded article was molded. In the secondary molding process, five sets of the primary molded article molded on the surface of the inner mold and covered with the outer mold were stacked, press working was performed with a vise on the five sets, and the five sets were left for an hour. In the drying process, the secondary molded article was removed from the filter mold and dried for 3 days. In the firing process, burr processing was performed on the secondary molded article after the drying process. Then, the secondary molded article was oxidation-fired for 12 hours at 1,260° C. The ceramic filter of Example 1 was obtained as a result.

Comparative Example 1

A raw material mixture was prepared as a result of the same blending as in Example 1 except that the amount of water was changed to 2,620 g (40 mass %). The raw material mixture was a slurry-state mixture having fluidity. The prepared slurry was molded into the same shape as that of the ceramic filter of Example 1 by so-called pressure casting for injection into a mold in a pressure-applied state. The molded product was removed from the filter mold and dried for 3 days. Then, burr processing was performed as in Example 1, and then firing was performed for 12 hours at 1,260° C. The ceramic filter of Comparative Example 1 was obtained as a result.

Comparative Example 2

A paper filter (manufactured by HARIO Co., Ltd., product name Paper Filter 02M for V60) was used as the paper filter of Comparative Example 2.

[Pore Distribution Measurement 1]

Figure 5:
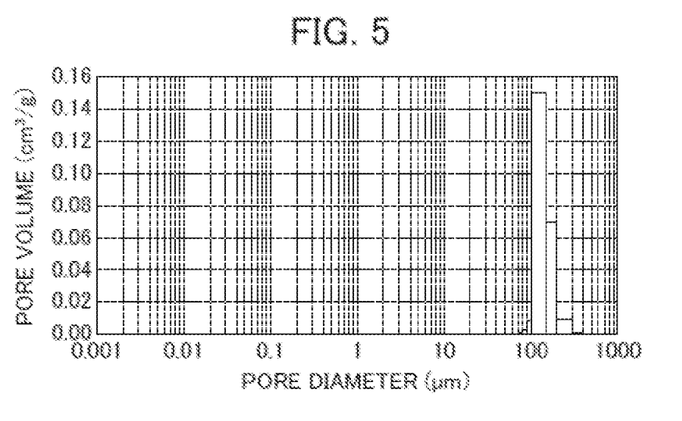
FIG. 5 is a diagram illustrating the pore distribution of a ceramic filter of Example 1.
Figure 6:
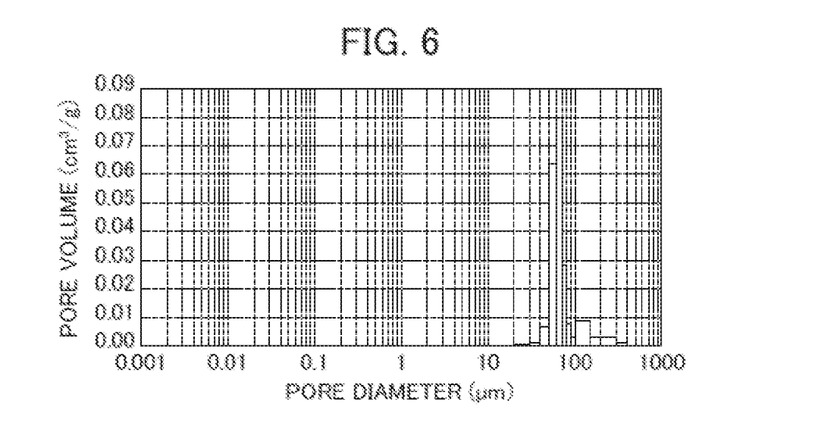
FIG. 6 is a diagram illustrating the pore distribution of a ceramic filter of Comparative Example 1.

Pore distribution measurement was performed on the ceramic filter of Example 1 and the ceramic filter of Comparative Example 1. The pore distribution measurement was performed by a mercury press-in method and by means of AutoPore IV 9520 manufactured by Micromeritics Instrument Corp. Test conditions are shown in Table 1 below. In addition, the result of the test is shown in Table 2. In addition, the frequency distribution of the pores of the ceramic filter of Example 1 is illustrated in FIG. 5, and the frequency distribution of the pores of the ceramic filter of Comparative Example 1 is illustrated in FIG. 6.

TABLE 1

| Pressure measurement range | 3.45 kPa~414 MPa |
|---|---|
| Mercury surface tension | 485 mN/M |
| Mercury contact angle | 130° |

TABLE 2

| | | Example 1 | Comparative Example 1 |
|---|---|---|---|
| Pore volume | Total pore volume | 0.2519 [cm³/g] | 0.2117 [cm³/g] |
| Surface area | Total pore specific surface area | 0.0091 [m²/g] | 0.0154 [m²/g] |
| Pore diameter | Average pore diameter (4 V/A) | 110.5905 [μm] | 55.1637 [μm] |
| Median pore diameter | Volume basis (Median pore diameter) | 139.1768 [μm] | 62.8580 [μm] |
| | Surface area basis | 126.3586 [μm] | 60.1023 [μm] |
| Density | Bulk density | 1.8294 [g/cm³] | 1.9522 [g/cm³] |
| | Apparent density | 3.3928 [g/cm³] | 3.3273 [g/cm³] |
| Mode diameter volume basis | First mode diameter | 139.9528 [μm] | 60.9666 [μm] |
| | Second mode diameter | 341.7358 [μm] | 6.6061 [μm] |
| | Third mode diameter | 32.2818 [μm] | 13.7321 [μm] |
| Mode diameter surface area basis | First mode diameter | 139.9528 [μm] | 60.9666 [μm] |
| | Second mode diameter | 0.6290 [μm] | 0.3805 [μm] |
| | Third mode diameter | 1.2210 [μm] | 0.9083 [μm] |
| Stem use rate | Stem use rate | 78 [%] | 53 [%] |
| Porosity | Porosity | 46.0817 [%] | 41.3282 [%] |

[Permeation Rate Measurement 1]

The times (seconds) taken in the case of permeation of 150 ml of water having a temperature of 20° C., in the case of permeation of 150 ml of hot water having a temperature of 90° C., and in the case of permeation of 150 ml of hot water having a temperature of 90° C. in a state where 10 g of ground and powdered coffee was put in were measured for each of the ceramic filter of Example 1, the ceramic filter of Comparative Example 1, and the paper filter of Comparative Example 2. Incidentally, the permeation rate measurement was performed in a state where the ceramic filters and the paper filter were dried. The result is shown in Table 3.

TABLE 3

| | Example 1 | Comparative Example 1 | Comparative Example 2 |
|---|---|---|---|
| Water | 8.5 | 59 | 60 |
| Hot water | 4.6 | 23 | 30 |
| Coffee | 65 | 100 | 110 |

[Taste Evaluation]

The taste of the coffee obtained as a result of extraction and filtration by the method of Table 3 was evaluated for each of the ceramic filter of Example 1, the ceramic filter of Comparative Example 1, and the paper filter of Comparative Example 2. The taste of the coffee was evaluated in terms of sweetness, astringency, bitterness, palatability, sourness, and oil content. Incidentally, the taste evaluation was performed by sensory evaluation conducted by 3 persons. Specifically, the circle marks represent sweetness, astringency, bitterness, palatability, sourness, and oil content comparable to those of the coffee of Comparative Example 2 as a reference obtained as a result of extraction and filtration by means of the paper filter, the double-circle marks represent cases where more sweetness, astringency, bitterness, palatability, sourness, and oil content were felt than in the case of the coffee of Comparative Example 2, and the triangle marks represent less sweetness, astringency, bitterness, palatability, sourness, and oil content than in the case of the coffee of Comparative Example 2. The result is shown in Table 4.

TABLE 4

| | Example 1 | Comparative Example 1 | Comparative Example 2 |
|---|---|---|---|
| Sweetness | ◎ | ◎ | ○ |
| Astringency | ◎ | Δ | ○ |
| Bitterness | ◎ | Δ | ○ |
| Palatability | ◎ | Δ | ○ |
| Sourness | ◎ | Δ | ○ |
| Oil content | ◎ | Δ | ○ |

As shown in Table 2, it was found that the ceramic filter of Example 1 is smaller in micropore size (median pore diameter) and larger in total pore volume than the ceramic filter of Comparative Example 1. In addition, as illustrated in FIGS. 5 and 6, it was found that the size distribution of the micropores concentrates in the vicinity of the median pore diameter in the ceramic filters of Example 1 and Comparative Example 1.

As shown in Table 3, the ceramic filter of Comparative Example 1 and the paper filter of Comparative Example 2 are permeated with water at substantially the same rate. In addition, in the case of the ceramic filter of Comparative Example 1, hot water permeation, and coffee extraction and filtration occur at a rate slightly higher than in the case of the paper filter of Comparative Example 2.

On the other hand, in terms of water and hot water permeation rate, the ceramic filter of Example 1 is at least 5 times the ceramic filter of Comparative Example 1 and the paper filter of Comparative Example 2. In addition, regarding coffee as well, the extraction and filtration rate of the ceramic filter of Example 1 is at least 30% of those of the ceramic filter of Comparative Example 1 and the paper filter of Comparative Example 2.

It was confirmed from the above that the water and hot water permeation rate in the case of ceramic filter molding by so-called pressure casting is approximately equal to that of the paper filter and the permeation rate cannot be sufficiently increased in that case. This is considered to be due to the fact that an increase in molded article density results from raw material mixture injection under pressure and hinders suitable micropore formation.

In addition, as shown in Table 4, it was found that the coffee put in by means of the ceramic filter of Example 1 is superior to the coffee brewed by means of the paper filter of Comparative Example 2 in all of the sweetness, astringency, bitterness, palatability, sourness, and oil content items, and is superior to the coffee brewed by means of the ceramic filter of Comparative Example 1 in every item except for sweetness. Incidentally, although the ceramic filter of Comparative Example 2 was superior to the paper filter in terms of sweetness, the ceramic filter of Comparative Example 2 was inferior to the paper filter in terms of astringency, bitterness, palatability, sourness, and oil content.

[Filter Clogging Evaluation 1]

Coffee brewing was performed by the ceramic filter of Example 1 and the ceramic filter of Comparative Example 1 being permeated with 150 ml of hot water having a temperature of 90° C. with 10 g of ground and powdered coffee put in. Then, the ceramic filters were washed with water and dried and the coffee brewing was repeated in the same manner.

As a result, the time taken for hot water permeation increased with the number of times and full hot water permeation became impossible on the second to third occasion as for the ceramic filter of Comparative Example 1. On the other hand, as for the ceramic filter of Example 1, the time for hot water permeation hardly changed even after repetition, and a hot water permeation rate (65 seconds) almost equal to the first hot water permeation rate could be maintained even after 20 repetitions.

It was confirmed from the above that clogging hardly occurs and a beverage excellent in flavor can be obtained with the ceramic filter of Example 1. Incidentally, a ceramic filter exhibiting the same effect as that of the present embodiment can be obtained by ceramic filter pore distribution setting within a range of at least plus-minus 10% or so of the numerical value of the pore distribution of the ceramic filter of Example 1.

Next, how the median pore diameter and the total pore volume affect clogging and the flavor was confirmed with a ceramic filter having a permeation time ranging from 3 seconds to 15 seconds in a case where 150 ml of hot water having a temperature of 90° C. is introduced.

Comparative Examples 3 to 5

The ceramic filters of Comparative Example 3 to Comparative Example 5 were obtained by the same method as in Example 1.

[Pore Analysis Measurement 2]

Pore distribution measurement was performed on the ceramic filters of Comparative Example 3 to Comparative Example 5. The pore distribution measurement was performed by the same method as that of the pore analysis measurement described above. The result of the test is shown in Table 5.

TABLE 5

|  |  | Comparative Example 3 | Comparative Example 4 | Comparative Example 5 |
| --- | --- | --- | --- | --- |
| Pore volume | Total pore volume | 0.2625 [$cm^3/g$] | 0.2285 [$cm^3/g$] | 0.1410 [$cm^3/g$] |
| Surface area | Total pore specific surface area | 0.0122 [$m^2/g$] | 0.0095 [$m^2/g$] | 0.0025 [$m^2/g$] |
| Pore diameter | Average pore diameter (4 V/A) | 85.8746 [μm] | 96.1913 [μm] | 228.2760 [μm] |
| Median pore diameter | Volume basis (Median pore diameter) | 83.4408 [μm] | 97.4149 [μm] | 243.1425 [μm] |
|  | Surface area basis | 80.6719 [μm] | 93.3202 [μm] | 228.3242 [μm] |
| Density | Bulk density | 1.8628 [$g/cm^3$] | 2.0172 [$g/cm^3$] | 2.3033 [$g/cm^3$] |
|  | Apparent density | 3.6462 [$g/cm^3$] | 3.7421 [$g/cm^3$] | 3.4111 [$g/cm^3$] |
| Mode diameter volume basis | First mode diameter | 83.6685 [μm] | 99.1817 [μm] | 277.4348 [μm] |
|  | Second mode diameter | 235.5766 [μm] | 60.9668 [μm] | 53.6875 [μm] |
|  | Third mode diameter | 472.575 [μm] | 341.7358 [μm] | 7.4235 [μm] |
| Mode diameter surface area basis | First mode diameter | 83.6685 [μm] | 99.1817 [μm] | 235.5766 [μm] |
|  | Second mode diameter | 6.6064 [μm] | 60.9666 [μm] | 7.4236 [μm] |
|  | Third mode diameter | 10.6913 [μm] | 47.4245 [μm] | 12.1415 [μm] |
| Stem use rate | Stem use rate | 67 [%] | 60 [%] | 39 [%] |
| Porosity | Porosity | 48.8980 [%] | 46.0937 [%] | 32.4762 [%] |

[Permeation Rate Measurement 2]

The time (seconds) taken in the case of permeation of 150 ml of hot water having a temperature of 90° C. and the time (seconds) taken in the case of permeation of 150 ml of hot water having a temperature of 90° C. in a state where 10 g of ground and powdered coffee was put in were measured for each of the ceramic filters of Comparative Example 3 and Comparative Example 4. The time (seconds) taken in the case of permeation of 150 ml of hot water having a temperature of 90° C. was measured for the ceramic filter of Comparative Example 5. Incidentally, the permeation rate measurement was performed in a state where the ceramic filters were dried. The result is shown in Table 6. Incidentally, the evaluation result of Example 1 is also described so as to facilitate comparison.

TABLE 6

|  | Example 1 | Comparative Example 3 | Comparative Example 4 | Comparative Example 5 |
| --- | --- | --- | --- | --- |
| Hot water | 4.6 | 15 | 7 | 3 |
| Coffee | 65 | 67 | 70 | — |

As shown in Table 6, it can be confirmed that the permeation time required in the case of introduction of 150 ml of hot water having a temperature of 90° C. ranges from 3 seconds to 15 seconds under every condition of Comparative Example 3 to Comparative Example 5. As for the ceramic filters of Comparative Example 3 and Comparative Example 4, hot water permeation is performed at a rate lower than in the case of the ceramic filter of Example 1 and coffee extraction and filtration are performed at the substantially the same rate as in the case of the ceramic filter of Example 1. As for the ceramic filter of Comparative Example 5, hot water permeation is performed at a rate slightly higher than in the case of the ceramic filter of Example 1.

As shown in Table 2 and Table 5, the ceramic filters of Comparative Example 3 and Comparative Example 4 are smaller in median pore diameter than the ceramic filter of Example 1. On the other hand, the ceramic filter of Comparative Example 5 is larger in median pore diameter than the ceramic filter of Example 1. In addition, the ceramic filter of Comparative Example 3 is slightly larger in total pore volume than the ceramic filter of Example 1. The ceramic filters of Comparative Example 4 and Comparative Example 5 are smaller in total pore volume than the ceramic filter of Example 1.

Comparing the total pore volumes and the median pore diameters of the ceramic filters of Comparative Example 3 to Comparative Example 5, it can be confirmed that the total pore volume decreases as the median pore diameter increases as shown in Table 2 and Table 5. This is considered to be due to the fact that the pressure of press working can be kept lower than in a case where a ceramic filter is molded by pressure casting as in Comparative Example 1 as the press working is performed after hand pressing-based molding. Here, micropores derived from crystalline cellulose and micropores attributable to a moisture-material clearance are present in the pores formed in the ceramic filters of Example 1, Comparative Example 1, and Comparative Example 3 to Comparative Example 5. The micropores attributable to the moisture-material clearance are smaller than the micropores derived from crystalline cellulose. According to the method for manufacturing the ceramic filters of Example 1 and Comparative Example 3 to Comparative Example 5, the micropores derived from crystalline cellulose hardly change whereas the micropores attributable to the moisture-material clearance collapse and decrease as an applied pressure increases. Accordingly, when the applied pressure is high, the micropores attributable to the moisture-material clearance decrease and the proportion occupied by the cellulose-derived micropores relatively increases. As a result, the total pore volume decreases whereas the median pore diameter increases. On the other hand, when the applied pressure is low, most of the micropores attributable to the moisture-material clearance remain without collapsing and the proportion occupied by the cellulose-derived micropores relatively decreases. As a result, the total pore volume increases whereas the median pore diameter decreases. In this manner, the balance between the median pore diameter and the total pore volume can be adjusted by the method for manufacturing the ceramic filters of Example 1 and Comparative Example 3 to Comparative Example 5.

[Taste Evaluation 2]

With regard to the ceramic filter of Comparative Example 5, the taste of coffee obtained as a result of extraction and filtration was evaluated by the same method as that of the taste evaluation described above. The flavor of the coffee weakened when the sensory taste evaluation was conducted. As a result, it can be confirmed that an increase in median pore diameter results in a weakening coffee flavor even when the permeation time required in the case of introduction of 150 ml of hot water having a temperature of 90° C. is 3 seconds to 15 seconds.

[Filter Clogging Evaluation 2]

With regard to the ceramic filters of Comparative Example 3 and Comparative Example 4, filter clogging evaluation was performed by the same method as that of the filter clogging evaluation described above.

As a result, it was confirmed that the time taken for hot water permeation and the likelihood of clogging increase with the number of times as for the ceramic filters of Comparative Example 3 and Comparative Example 4. Specifically, in Comparative Example 3, the 20th permeation time was 111 seconds whereas the first permeation time was 67 seconds. In Comparative Example 4, the 20th permeation time was 103 seconds whereas the first permeation time was 70 seconds. On the other hand, in the ceramic filter of Example 1, a hot water permeation rate (65 seconds) almost equal to the first hot water permeation rate could be maintained even after 20 repetitions as described above.

It was found from the above that the median pore diameter and the total pore volume as well as the permeation time need to be adjusted for exhibition of the filter clogging suppression effect and the excellent flavor that are obtained with the ceramic filter of the present invention.

EXPLANATION OF REFERENCE NUMERALS

1 CERAMIC FILTER
11 HOLE PORTION
C CUP
P FILTER RECEIVER

What is claimed is:

1. A ceramic filter for a beverage, the ceramic filter requiring a permeation time ranging from 3 seconds to 15 seconds in a case where 150 ml of hot water having a temperature of 90° C. passes through the ceramic filter, having a total pore volume of 0.230 to 0.270 cm$^3$/g, and having a median pore diameter of 100 to 160 μm.

2. The ceramic filter for a beverage according to claim 1, wherein the ceramic filter is formed in a bowl shape.

3. The ceramic filter of claim 1, wherein the ceramic filter is integrally molded.

4. A ceramic filter for a beverage, the ceramic filter having a total pore volume of 0.230 to 0.270 cm$^3$/g, a median pore diameter of 100 to 160 μm, and a predetermined thickness, such that a permeation time for 150 ml of hot water having a temperature of 90° C. passing through the ceramic filter ranges from 3 seconds to 15 seconds.

5. The ceramic filter of claim 4, wherein the predetermined thickness ranges from 2 mm to 5 mm.

* * * * *